United States Patent [19]

Terashima et al.

[11] Patent Number: 4,882,086
[45] Date of Patent: Nov. 21, 1989

[54] FERROELECTRIC LIQUID CRYSTAL COMPOSITION

[75] Inventors: Kanetsugu Terashima; Mitsuyoshi Ichihashi, both of Ichiharashi; Makoto Kikuchi, Kisarazushi; Fusayuki Takeshita, Ichiharashi; Kenji Furukawa, Yokosukashi, all of Japan

[73] Assignee: Chisso Corporation, Osaka, Japan

[21] Appl. No.: 298,989

[22] Filed: Jan. 19, 1989

[30] Foreign Application Priority Data

Feb. 9, 1988 [JP] Japan .................. 63-27940

[51] Int. Cl.⁴ .................. C09K 19/34; G02F 1/13
[52] U.S. Cl. .................. 252/299.61; 252/299.01; 350/350 S
[58] Field of Search .................. 252/299.01, 299.61; 350/350 S

[56] References Cited

U.S. PATENT DOCUMENTS

| 4,780,241 | 10/1988 | Furukawa et al. | 252/299.01 |
| 4,826,621 | 5/1989 | Terashima et al. | 252/299.61 |

FOREIGN PATENT DOCUMENTS

| 206228 | 12/1986 | European Pat. Off. | 252/229.01 |
| 225195 | 6/1987 | European Pat. Off. | 252/299.61 |
| 260077 | 3/1988 | European Pat. Off. | 252/299.61 |
| 2257588 | 6/1973 | Fed. Rep. of Germany | 252/299.61 |
| 3500909 | 7/1986 | Fed. Rep. of Germany | 252/299.61 |
| 3515373 | 11/1986 | Fed. Rep. of Germany | 252/299.61 |
| 3515374 | 11/1986 | Fed. Rep. of Germany | 252/299.61 |
| 6222889 | 1/1987 | Japan | 252/299.61 |
| 62209190 | 9/1987 | Japan | 252/299.61 |
| 8606401 | 11/1986 | World Int. Prop. O. | 252/299.61 |

OTHER PUBLICATIONS

Demus, et al., Flussige Kristalle im Tabellen II, Veb Deutscher Verlag fur Grundstoffindustrie, Leipzig, pp. 375-379, (1984).

*Primary Examiner*—Teddy S. Gron
*Attorney, Agent, or Firm*—Fred Philpitt

[57] ABSTRACT

A ferroelectric liquid crystal composition exhibiting SC* phase within a broad temperature range including room temperature and yet having cholesteric phase and further high-speed response properties and a light switching element using the above composition and having high-speed response properties are provided, which composition comprises an achiral compound expressed by the formula

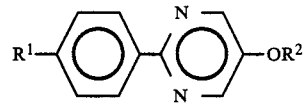

wherein $R^1$ and $R^2$ each represent the same or different linear or branched chain alkyl group of 1 to 18 carbon atoms, in 20 to 70% by weight and having cholesteric phase; and which composition may further comprise at least one member of optically active compounds selected from four specified pyrimidine compounds.

4 Claims, 5 Drawing Sheets

FERROELECTRIC LIQUID CRYSTAL COMPOSITION

BACKGROUND OF THE INVENTION

1. Field of the Invention

This invention relates to a ferroelectric liquid crystal material. More particularly it relates to a ferroelectric liquid crystal composition comprising at least one achiral smectic liquid crystal compound and at least one optically active compound and having high-speed response properties and a superior alignment, and also to a light switching element using the composition.

2. Description of the Related Art

Liquid crystal compounds have been broadly used as materials for liquid crystal display elements, but most of such liquid crystal display elements are those of TN display mode and as liquid crystal materials, those belonging to nematic phase have been used.

Since TN display mode is non-emissive, it has specific features that eyes are not tired and the power consumption is very small, but on the other hand, it has drawbacks that the response is slow and the display is not seen depending on the viewing angle.

The above-mentioned mode has recently been turning toward a direction making use of its characteristic of flat display, and in particular, high-speed response properties and a broad viewing angle have been required.

In order to satisfy such requirements, various improvements in liquid crystal materials have been made. However, as compared with other emissive mode displays (such as electroluminescence display, plasma display, etc.), TN display mode is observed to have a considerably large difference from the above display modes in the aspects of the response time and the breadth of viewing angle.

In order to make use of the specific features of non-emissive mode and small power consumption and also to ensure response properties matching those of emissive mode display, development of a novel liquid crystal display mode in place of TN display mode is indispensable.

As one of such attempts therefor, a display mode utilizing the light switching phenomenon of ferroelectric liquid crystals has been proposed by N. A. Clark and S. T. Lagewall (see Appl. Phys. Lett. 36, 899, 1980).

The presence of ferroelectric liquid crystals was announced by R. B. Meyer et al in the year of 1975 for the first time (see Journal de Physique, 36, 69, 1975), and the crystals belong in the aspect of liquid crystal structure to chiral smectic C phase, chiral smectic I phase, chiral smectic F phase, chiral smectic G phase and chiral smectic H phase (hereinafter abbreviated to SC* phase, SI* phase, SF* phase, SG* phase and SH* phase, respectively).

In the chiral smectic phases, molecules form layers and are tilted against the surfaces of the layers, the helical axis being perpendicular to the surfaces.

In the chiral smectic phases, a spontaneous polarization is formed; hence when a direct current electric field is impressed in parallel to the layers, the molecules are inverted around the helical axis as a rotating axis, depending on the polarity. Display elements using ferroelectric liquid crystals utilize this switching phenomenon.

Among the chiral smectic phases, SC* phase has now been particularly noted.

As to the display mode utilizing the switching phenomenon of SC* phase, the following two modes may be considered:

one mode is a birefringence mode using two polarizers and the other mode is a guest-host mode using a dichroic dyestuff.

Such display mode has the following specific features:

(1) the response time is very rapid;
(2) there are memory properties;
(3) the viewing angle-dependency is small; etc.;

thus the mode has a possibility of a high density display and hence it is very attractive for display elements.

Ferroelectric liquid crystal materials used for ferroelectric liquid crystal display elements for practical use require a number of specific features, but at present, there is no single compound which satisfies these specific features; hence it is necessary to use ferroelectric liquid crystal compositions obtained by blending some liquid crystal compounds or non liquid crystal compounds.

Further, ferroelectric liquid crystal compositions are not limited only to those consisting only of ferroelectric liquid crystal compounds, but also it has been reported in Japanese patent application laid-open No. Sho 61-195187/1986 that when at least one member of compounds exhibiting ferroelectric liquid crystal phase is blended with compound(s) or composition(s) exhibiting achiral smectic C, F, G, H, I phase or the like (hereinafter abbreviated to SC phase or the like) as basic substance(s), it is possible to make the whole a ferroelectric liquid crystal composition. Further, it has also been reported that when at least one member of compounds which are optically active but exhibit no ferroelectric liquid crystal phase is blended with compound(s) or composition(s) exhibiting SC phase or the like as base substance(s), it is possible to make the whole a ferroelectric liquid crystal composition (Mol. Cryst. Liq. Cryst., 89, 327 (1982)).

In summary of these facts, it is seen that when 10 at least one member of optically active compounds, irrespective of whether or not the compound exhibits ferroelectric liquid crystal phase, is blended with basic substance(s), it is possible to form a ferroelectric liquid crystal composition.

At present, a number of specific features have been required for ferroelectric liquid crystal materials, but for example when they are used for practical display elements (640 lines×400 lines), the following facts are particularly required:

(1) SC* phase is exhibited within a broad temperature range including room temperature (at least 0° C. to 50° C.);

(2) the response time is 100 $\mu$sec or less; and (3) the alignment is superior. At present, however, no ferroelectric liquid material (liquid crystal composition) satisfying all of such conditions has yet been obtained.

For example, official gazette of Japanese patent application laid-open No. Sho 61-291679/1986 and pamphlet of PCT international application laid-open No. W086/06401 disclose ferroelectric liquid crystal mixture(s) obtained by blending an achiral 5-alkyl-2-(4-alkoxyphenyl)pyrimidine having SC phase with optically active compound(s), which mixture(s) exhibit SC* phase within a broad temperature range including room temperature. Further, the former gazette discloses that since the pyrimidine derivative has a very low viscosity, its use in the form of a base SC mixture is very effective for improving the response properties of ferroelectric compositions. However, the ferroelectric liquid crystal composition(s) satisfy the above requirement as regards the temperature range of SC* phase, but the response time is 300 μsec to 500 μsec (e.g. see ferroelectric liquid crystal compositions described in Examples 1 and 2 of the above gazette and those described in Examples 45 and 46 of the pamphlet); hence the composition(s) are difficultly regarded as practical.

Further, the specification of Japanese patent application No. Sho 62-137883/1987 discloses ferroelectric liquid crystal composition(s) obtained by blending an achiral 5-alkoxy-2-(4-alkylphenyl)pyrimidine having SC phase with optically active compound(s), which composition(s) exhibit SC* phase within a broad temperature range including room temperature and yet have very high-speed response properties. For example, the ferroelectric liquid crystal composition described in Example 5 exhibits SC* phase within a broad temperature range of 5° to 52° C. and the response time is 50 μsec; hence the composition satisfies the above requirements (1) and (2). Thus, the composition is considered to be very practical as compared with the ferroelectric liquid crystal compositions described in the above gazette and pamphlet.

However, the ferroelectric liquid crystal composition(s) described in the above specification of Japanese patent application No. Sho 62-137883/1987 have a serious problem when they are practically used. Namely, the composition(s) have no cholesteric phase; hence according to alignment technique currently employed for TN liquid crystal materials, no uniform alignment cannot have been achieved.

At present, as the alignment for ferroelectric liquid crystal materials, three methods of shearing method, temperature gradient method and surface treatment method have been attempted. According to the shearing method, alignment is effected by applying a shearing stress in smectic A phase, and the temperature gradient method is a method similar to epitaxial crystal growth method, having noted the fact that smectic phase can be regarded as one-dimensional crystal.

The surface treatment method has been practically employed for aligning TN liquid crystal materials and is a method of coating the substrate of a cell with a high-molecular film such as polyimide film, followed by subjecting the resulting surface to rubbing treatment to align liquid crystal molecules. From the viewpoint of commercial production of liquid crystal display elements, it is most preferred to align liquid crystal molecules according to the surface treatment method.

The phase transition forms of ferroelectric liquid crystal materials include the following four: (i) Iso phase→SC* phase, (ii) Iso phase→N* phase→SC* phase, (iii) Iso phase→SA phase→SC* phase and (iv) Iso phase→N* phase→SA phase→SC* phase wherein Iso phase, N* phase and SA phase represent isotropic liquid phase, cholesteric phase and smectic A phase, respectively.

Among these, ferroelectric liquid crystal materials for which the current alignment technique (surface treatment method) is employable as it is, are those having the phase transition form expressed by (iv) (e.g. see Japanese patent application laid-open No. Sho 6-250086/1986). Thus, ferroelectric liquid crystal materials having the phase transition form expressed by (iv) have been earnestly desired.

The ferroelectric liquid crystal composition(s) disclosed in the above Japanese patent application No. Sho 62-137883/1987 have no cholesteric phase; hence in order to uniformly align these compositions, the shearing method or the temperature gradient method should be employed, and a long time is required for the alignment so that the alignment cannot be easily effected. Further, since the current alignment technique cannot be employed as it is, investment for a new equipment is required; hence the above ferroelectric liquid crystal composition(s) are difficultly regarded as practical.

As apparent from the foregoing, currently known ferroelectric liquid crystal materials cannot be yet regarded as practical; hence a further improvement in the specific features thereof has been earnestly desired.

The present inventors have made extensive research in order to further improve the invention described in the above Japanese patent application No. Sho 62-137883/ 1987. As a result, we have found that when compounds are combined together as shown below, there is obtained a ferroelectric liquid crystal composition exhibiting SC* phase within a broad temperature range including room temperature and yet having cholesteric phase and further having high-speed response properties, and have achieved the present invention.

SUMMARY OF THE INVENTION

As apparent from the foregoing, a first object of the present invention is to provide a ferroelectric liquid crystal composition exhibiting SC* phase within a broad temperature range including room temperature and yet having cholesteric phase and further, high-speed response properties. A second object of the present invention is to provide a light switching element using the above-mentioned liquid crystal composition and having superior response properties.

The present invention in a first aspect resides in (1) a ferroelectric liquid crystal composition comprising an achiral compound expressed by the formula

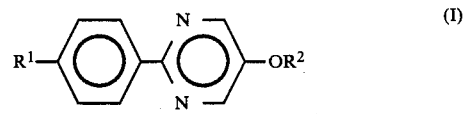

wherein $R^1$ and $R^2$ each represent the same or different linear or branched chain alkyl group of 1 to 18 carbon atoms, in 20 to 70% by weight and having cholesteric phase; and (2) a ferroelectric liquid crystal composition according to item (1), further comprising at least one member of optically active compounds selected from the group consisting of compounds expressed by the following formulas (II) to (V) in 10 to 50% by weight and having cholesteric phase:

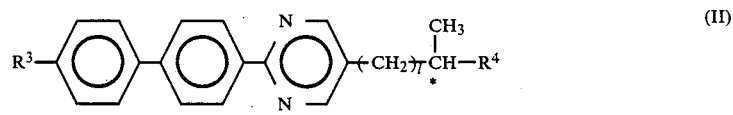

-continued

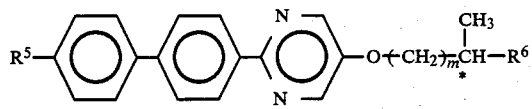

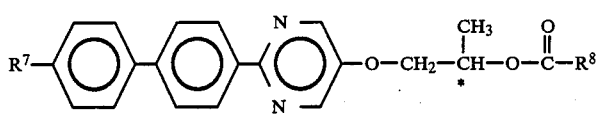

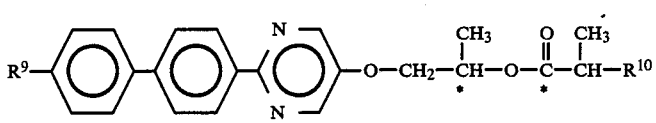

wherein $R^3$, $R^5$, $R^7$ and $R^9$ each represent a linear or branched alkyl group or alkoxy group each of 1 to 18 carbon atoms, $R^4$, $R^6$ and $R^{10}$ each represent a linear or branched alkyl group or alkoxy group each of 2 to 18 carbon atoms or a linear or branched alkoxy group of 1 to 18 carbon atoms, $R^8$ represents a linear or branched chain alkyl group or alkoxy group each of to 18 carbon atoms, l and m each represent an integer of 0 to 10 and * indicates an asymmetric carbon atom.

The present invention in a second aspect resides in (3) a light switching element using the ferroelectric liquid crystal composition according to item (1) or item (2).

DETAILED DESCRIPTION OF PREFERRED EMBODIMENTS

Figure 1:
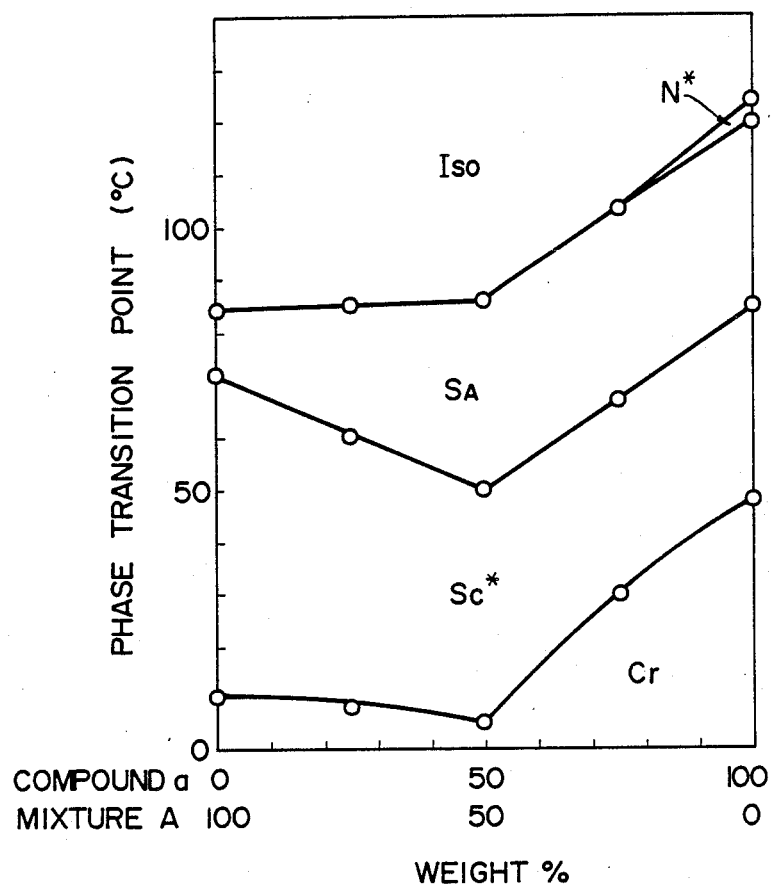
FIGS. 1, 2, 3, 4 and 5 show the respective phase diagrams of a mixture system of a base SC mixture A with a chiral compound a, that of a base SC mixture A with a chira compound b, that of a base SC mixture A with a chiral compound c, that of a base SC mixture A with a chiral compound d and that of a base SC mixture A with a chiral compound e, the mixture A being directed to the present invention.

The achiral compound of the formula (I) described in the above item (1) is a compound the patent application of which has previously been filed by the present inventors (Japanese patent application Sho No. 62-137884/1987, not yet laid open) and which difficultly exhibits nematic phase, but is abundant in smectic C properties and functions as a base SC compound in the ferroelectric liquid crystal composition aimed in the present invention (i.e. exhibits SC phase within a broad temperature range). Thus, compounds having SC phase are preferably used, but even compounds exhibiting no SC phase may also be used in a quantity limited to within a range wherein the temperature range of SC* phase is not notably narrowed.

As the compound expressed by the formula (I), pyrimidine derivatives of the formula (I) wherein $R^1$ represents a linear alkyl group of 4 to 18 carbon atoms and $R^2$ represents a linear alkyl group of 7 to 18 carbon atoms are exemplified. In the present invention, it is preferred to use a plurality of these pyrimidine derivatives. Particularly preferred pyrimidine derivatives having SC phase are illustrated in Table 1.

TABLE 1

Compounds expressed by:

| $R^1$ | $R^2$ | $R^1$ | $R^2$ |
|---|---|---|---|
| $C_6H_{13}-$ | $C_7H_{15}-$ | $C_8H_{17}-$ | $C_9H_{19}-$ |
| " | $C_8H_{17}-$ | " | $C_{10}H_{21}-$ |
| " | $C_9H_{19}-$ | " | $C_{11}H_{23}-$ |
| " | $C_{10}H_{21}-$ | " | $C_{12}H_{25}-$ |
| " | $C_{11}H_{23}-$ | " | $C_{13}H_{27}-$ |
| " | $C_{12}H_{25}-$ | $C_9H_{19}-$ | $C_8H_{17}-$ |
| " | $C_{13}H_{27}-$ | " | $C_9H_{19}-$ |
| " | $C_{14}H_{29}-$ | " | $C_{10}H_{21}-$ |
| " | $C_{15}H_{31}-$ | " | $C_{11}H_{23}-$ |
| $C_7H_{15}-$ | $C_7H_{15}-$ | " | $C_{12}H_{25}-$ |
| " | $C_8H_{17}-$ | " | $C_{13}H_{27}-$ |
| " | $C_9H_{19}-$ | $C_{10}H_{21}-$ | $C_8H_{17}-$ |
| " | $C_{10}H_{21}-$ | " | $C_9H_{19}-$ |
| " | $C_{11}H_{23}-$ | " | $C_{10}H_{21}-$ |
| " | $C_{12}H_{25}-$ | " | $C_{11}H_{23}-$ |
| $C_8H_{17}-$ | $C_7H_{15}-$ | " | $C_{12}H_{25}-$ |
| " | $C_8H_{17}-$ | | |

As described above, in the ferroelectric liquid crystal composition of the present invention, it is particularly preferred to combine only a plurality of compounds expressed by the formula (I) and having SC phase as illustrated above, but it is also possible to combine at least one member of the above-mentioned compounds with at least one member of known liquid crystal compounds with the intention of adjusting the SC phase temperature range. Examples of such known compounds are liquid crystal compounds abundant in semectic C properties such as biphenylyl benzoates, phenylcyclohexanes, azo compounds, azoxy compounds, phenylpyridines, 2,5-diphenylpyrimidines, etc. Particularly preferred compounds among these are 5-alkyl-2-(4-alkoxyphenyl)pyrimidine compounds or 5-alkyl-2-(4-alkylbiphenyl)pyrimidine compounds and these may be used within a range where the object of the present invention is not damaged.

The chiral compounds of the formulas (II)–(V) described in the above item (2) are compounds the patent application of which has previously been filed by the present inventors (Japanese patent application No. Sho 62-103977/1987), and which are abundant in cholesteric properties, and play an important role of causing N* phase to appear in the ferroelectric liquid crystal composition aimed in the present invention. Further, since the compounds expressed by the formulas (IV) and (V) have a large spontaneous polarization value, they also play an important role of exhibiting high-speed response properties in the ferroelectric liquid crystal composition aimed in the present invention.
Compounds expressed by the formulas (II)-(V) and having N* phase are illustrated below:
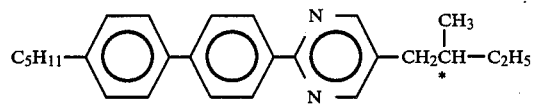
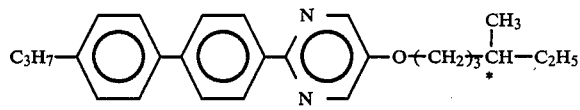
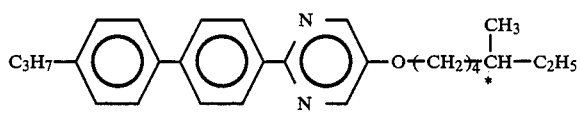
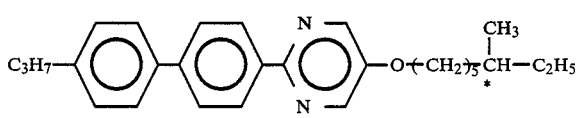
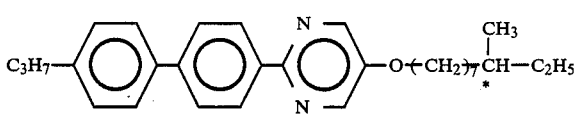
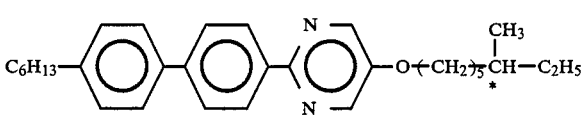
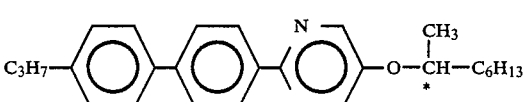
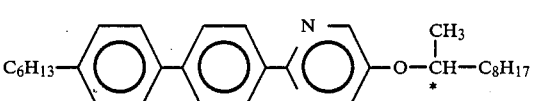
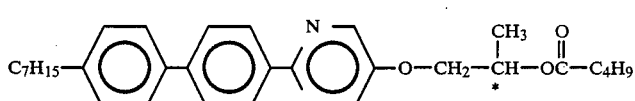
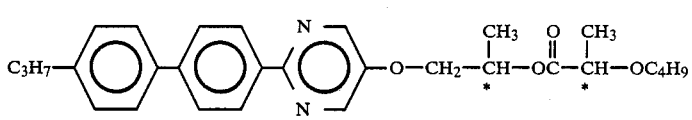
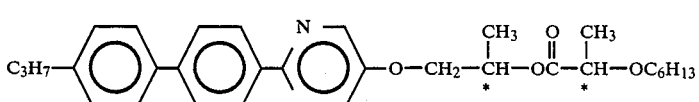
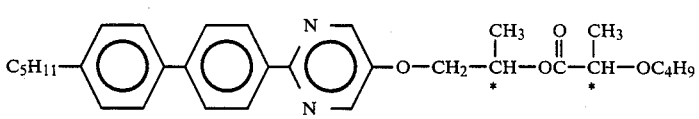

-continued

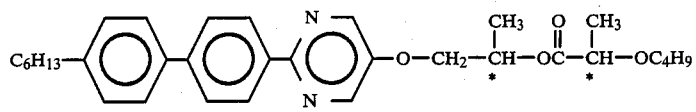
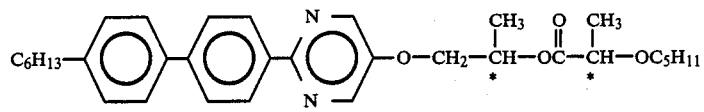
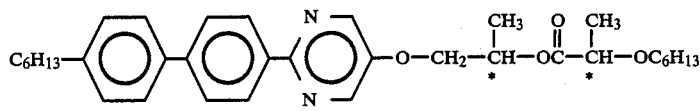
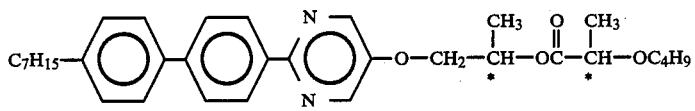
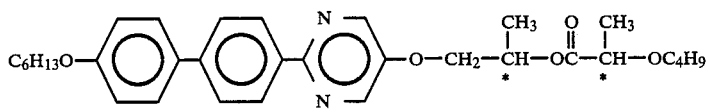
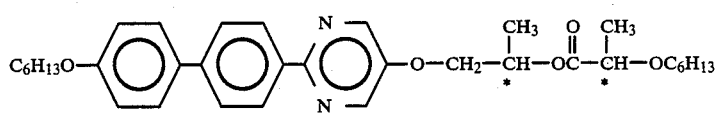
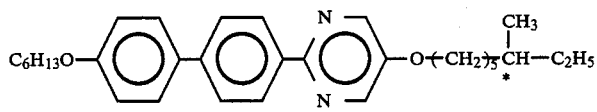
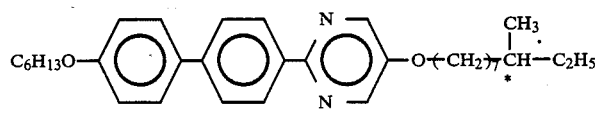
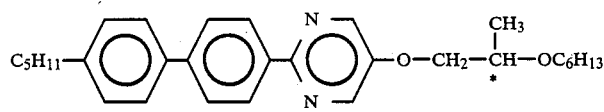

In the ferroelectric liquid crystal composition aimed in the present invention, as compounds for causing the composition to exhibit N* phase, those expressed by the formulas (II)–(V) are particularly preferred, but compounds other than the above may be used as far as they do not damage the object of the present invention. Such compounds will be illustrated below.

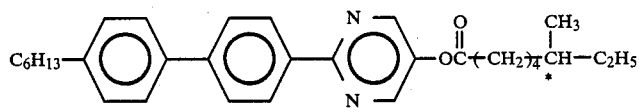
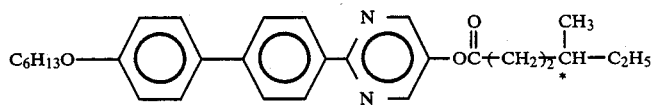
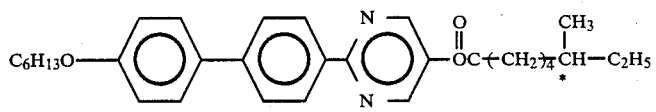

-continued

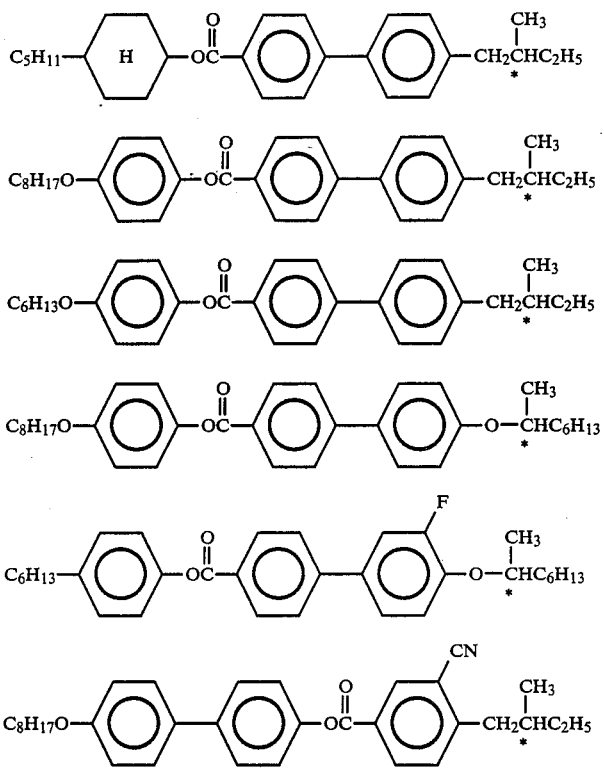

As described above, the ferroelectric liquid crystal composition aimed in the present invention may be obtained mainly by combining the achiral phenylpyrimidine compound(s) expressed by the formula (I) with compounds abundant in cholesteric properties, particularly those expressed by the formulas (II)–(V), but besides these compounds, in order to adjust the helical pitch, the following chiral compounds may also be used as far as they do not damage the object of the present invention:

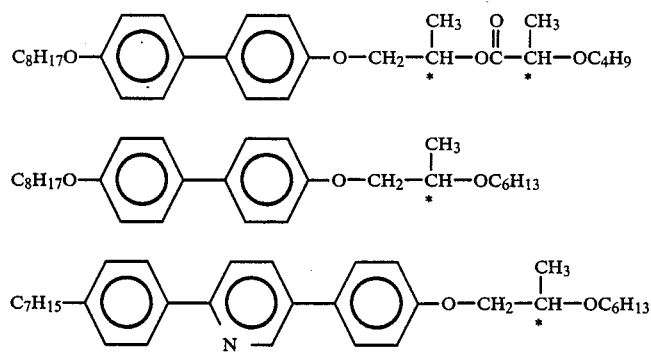

The present invention is based on a finding that when the achiral phenylpyrimidine compound(s) expressed by the formula (I) are combined with chiral compound(s) abundant in cholesteric properties, particularly those expressed by the formulas (II)–(V), the resulting composition(s) exhibit superior specific features.

The 5-alkoxy-2-(4-alkylphenyl)pyrimidine compounds expressed by the formula (I), as described in Japanese patent application No. Sho 62-137883/1987 previously filed by the present inventors, are difficult to exhibit nematic phase, but abundant in smectic C properties, exhibit SC phase in the vicinity of room temperature, have a low viscosity and has an effect of increasing the spontaneous polarization value of ferroelectric liquid crystal compositions; hence in the ferroelectric liquid crystal composition aimed in the present invention, too, they play a role of a base SC compound and exert a motive force to exhibit SC* phase within a broad temperature range including room temperature.

The chiral biphenylpyrimidine compounds expressed by the formulas (II)–(V) are abundant in cholesteric properties, and among these compounds, those expressed by the formulas (IV) and (V) have a very large spontaneous polarization value; hence these compounds play an important role of developing N* phase and also developing high-speed response properties in the ferroelectric liquid crystal composition aimed in the present invention.

A base SC mixture A was prepared from the following compounds each expressed by the formula (I):

| Base SC mixture A | |
|---|---|
| $C_6H_{13}$—⟨phenyl⟩—CH=N—⟨phenyl⟩—$OC_8H_{17}$ | 25 wt. % |
| $C_6H_{13}$—⟨phenyl⟩—CH=N—⟨phenyl⟩—$OC_9H_{19}$ | 15 wt. % |
| $C_7H_{15}$—⟨phenyl⟩—CH=N—⟨phenyl⟩—$OC_9H_{19}$ | 25 wt. % |
| $C_8H_{17}$—⟨phenyl⟩—CH=N—⟨phenyl⟩—$OC_9H_{19}$ | 10 wt. % |
| $C_9H_{19}$—⟨phenyl⟩—CH=N—⟨phenyl⟩—$OC_9H_{19}$ | 25 wt. % |

This base SC mixture A exhibited the following phase transition points and exhibited no nematic phase, but exhibited SC phase within a broad temperature range including room temperature

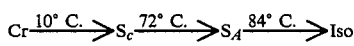

wherein Cr represents crystal.

As apparent from the specification of Japanese patent application No. Sho 62-137883/1987, the ferroelectric liquid crystal composition containing the compound expressed by the formula (I) as a base SC compound has far superior response properties, but does not exhibit N* phase; hence it has been difficult to utilize the current aligning technique as it is. Further, in order to make the composition exhibit N* phase, the concentration of the compound expressed by the formula (I) should be low so that the specific features of the compound expressed by the formula (I) are lost. Thus, how to make the composition exhibit N* phase without damaging the specific features of the compound expressed by the formula (I) has been an important problem. The present inventors have made extensive research and as a result, have found that when chiral compounds expressed by the formulas (II)–(V) and abundant in cholesteric properties are combined with the compound expressed by the formula (I), there is obtained a ferroelectric liquid crystal composition which exhibits SC* phase within a broad temperature range including room temperature and yet has N* phase and high-speed response properties.

Figure 2:
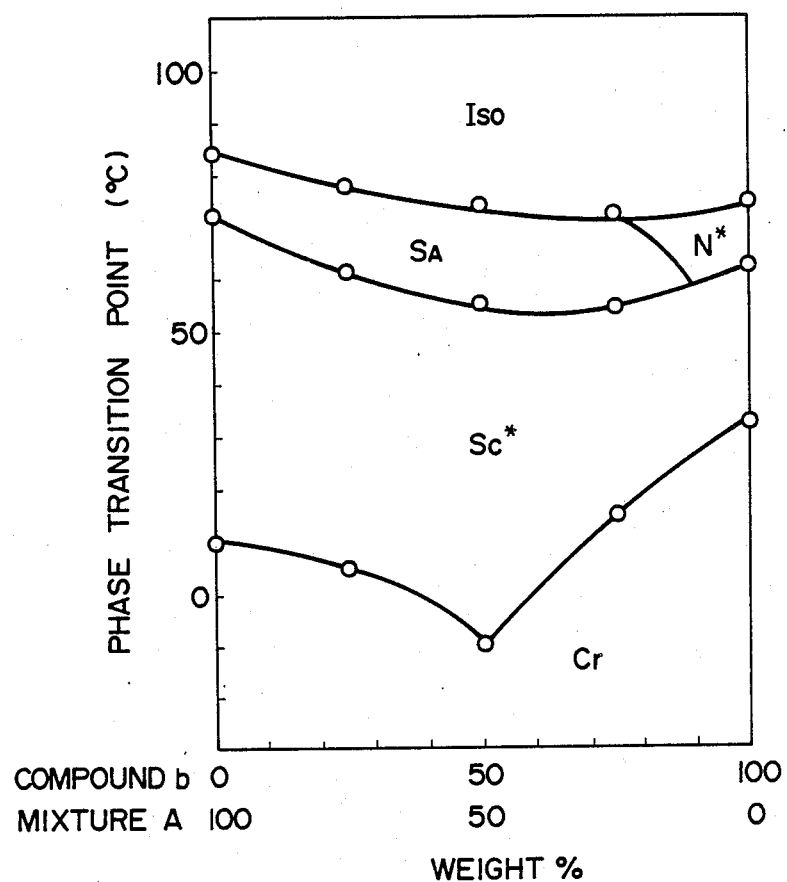
Figure 3:
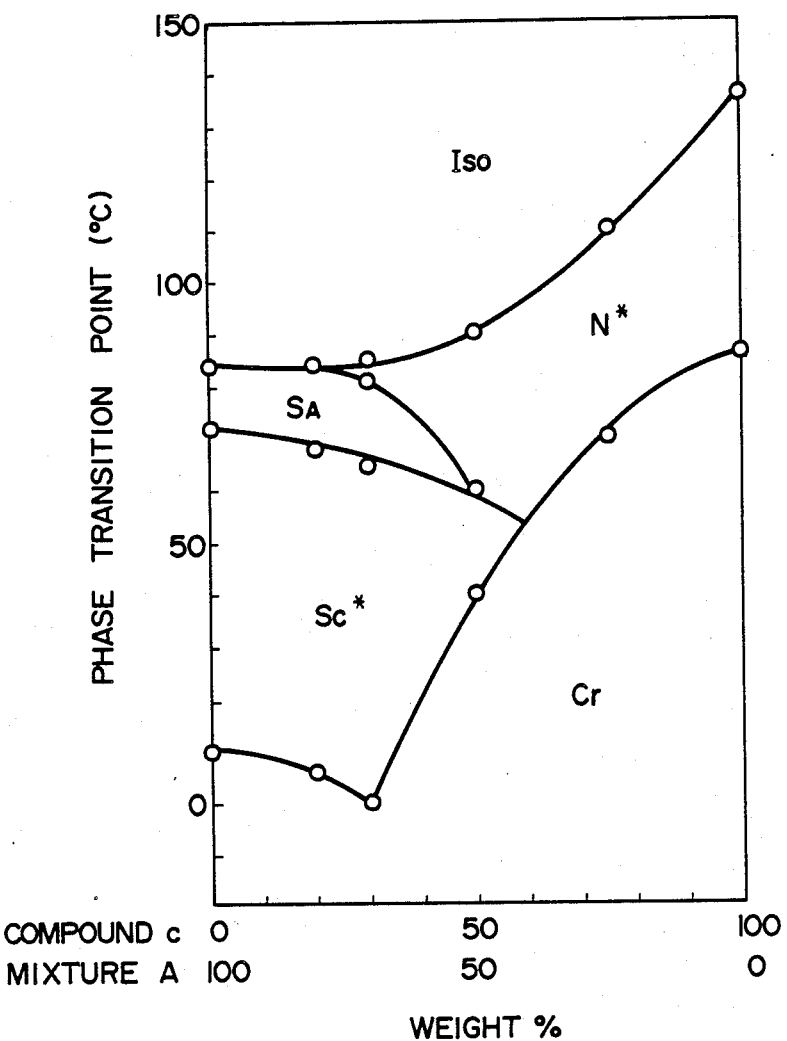
Figure 4:
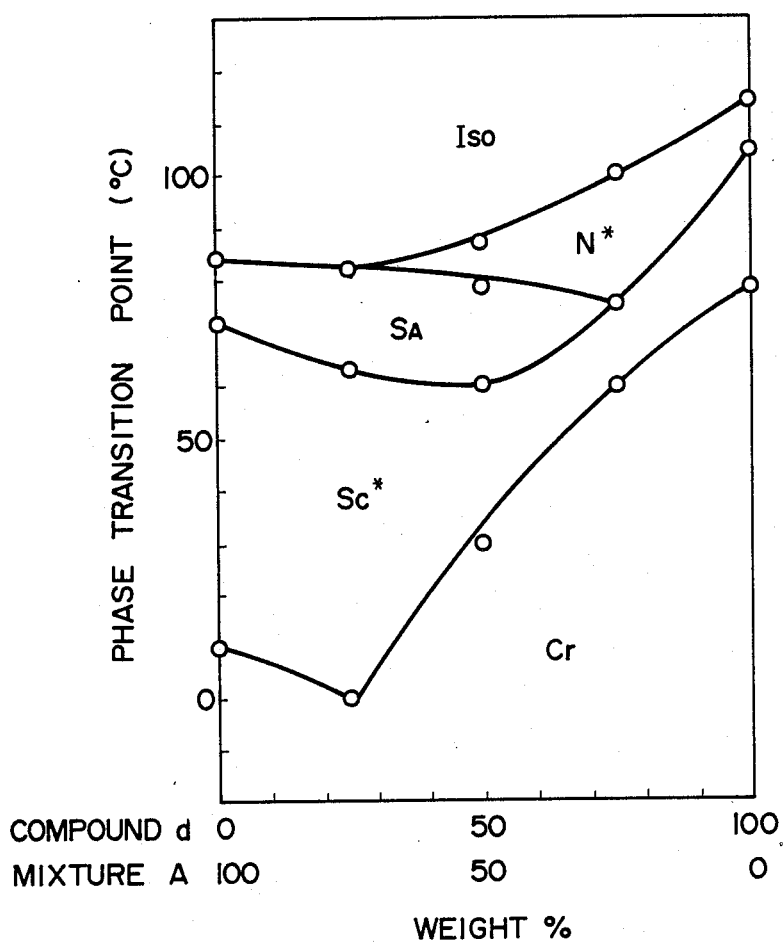
Figure 5:
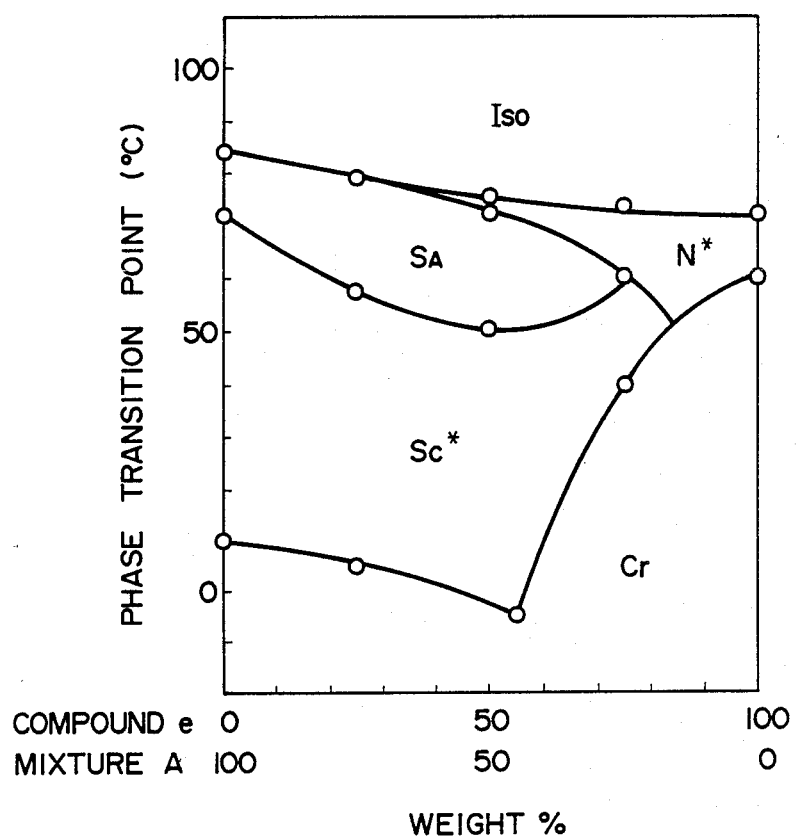

With the respective two component mixture systems consisting of the above base SC mixture A and each of the chiral compounds of the following formulas (a)–(e), phase diagrams were prepared, and the concentrations in which N* phase appeared were compared relative to the respective compounds. FIGS. 1–5 each show the phase diagrams with the respective mixture systems:

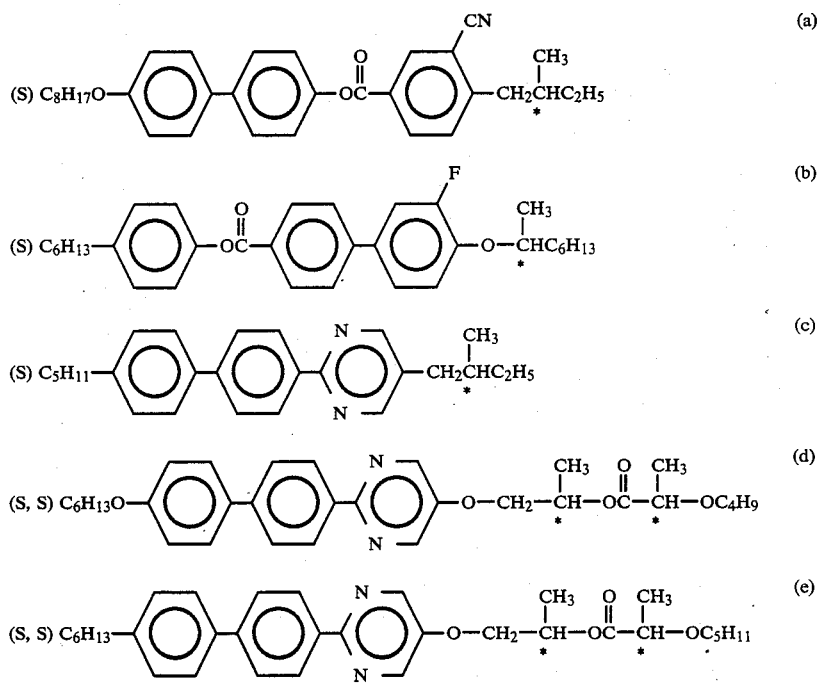

As seen from FIGS. 1–5, the compounds, c, d and e expressed by the formula (II) and (V) are abundant in cholesteric properties as compared with compounds a and b (compounds described in the specification of Japanese patent application No. 62-137883/1987), and in the case of compounds a and b, unless the concentrations of compounds a and b exceed 75% by weight, N* phase does not appear, whereas in the case of compounds c, d and e, N* phase appears when the concentrations of compounds c, d and e are about 25% by weight. This suggests that a ferroelectric liquid crystal composition having good aligning properties without damaging the superior specific features of the achiral compounds expressed by the formula (I) is obtained. The following ferroelectric liquid crystal composition B was prepared from the above-mentioned base SC mixture and compounds expressed by the formulaas (II) and (V):

Ferroelectric liquid crystal composition B

The phase transition points of this ferroelectric liquid crystal composition B were as follows:

Further, the spontaneous polarization value at 25° C. was 55 nC/cm², the tilt angle was 26° and the response time was 70 μsec at an electric field intensity of 5 V/μm (corresponding to d=2 μm and $V_{pp}$=20 V). Further, the aligning properties were very good, and when the composition was filled in a cell of 2 μm in cell gap provided with transparent electrodes each obtained by coating the surface with a PVA film as an aligning agent, followed by rubbing treatment, a uniform alignment without any fault was obtained; thus it has been found that the current aligning technique can be utilized as it is. Further, a liquid crystal display element having a very good contrast (1:20) was obtained.

As apparent from the foregoing, it has been found that when compounds expressed by the formula (I) and the formulas (II)-(V) of the present invention are combined together, there is obtained a ferroelectric liquid crystal composition which satisfies all of now earnestly desired specific features that is, those exhibiting SC* phase within a broad temperature range including room temperature, having N* phase and yet having high-speed response properties.

The respective proportions of the compounds expressed by the formulas (I) and (II)-(V) for obtaining the ferroelectric liquid crystal composition having superior specific features aimed in the present invention by making use of the specific features of the respective compounds are 20 to 70% by weight in the case of the compound expressed by the formula (I) and 10 to 50% by weight in the case of compounds expressed by the formulas (II)-(V), taking into account the role of the compound of the formula (I) functioning as a base SC compound and also the role of compounds of the formula (II)-(V) functioning so as to cause the composition to exhibit N* phase.

The present invention will be described in more detail by way of Examples, but it should not be construed to be limited thereto.

In Examples, the spontaneous polarization value (Ps) was measured according to Sawyer-Tower's method, the helical pitch (P) was sought by using a cell of 200 μm thick subjected to homogeneous alignment and directly measuring the distance between dechiralization lines corresponding to the helical pitch under a polarizing microscope. The tilt angle (θ) was sought by impressing a sufficiently high electric field exceeding a critical electric field to a cell subjected to homogeneous alignment to make the helical structure extinct, further inverting the polarity and observing the angle by which the extinction site moved (corresponding to 2θ) under crossed nicols.

The response time was measured from change in the intensity of transmitted light observed when the respective compositions were each filled in a cell provided with electrodes subjected to aligning treatment and having a gap between the electrodes of 2 μm, followed by impressing a square wave of $V_{pp}$ (20 V, 100 Hz).

In addition, Examples include some compositions containing chiral compounds or achiral compounds for the purpose of prolonging the helical pitch of N* phase or SC* phase or broadening the temperature range of SC* phase, besides compounds expressed by the formula (I) or the formula (II), but to contain the aforementioned compounds do not damage the specific features of the ferroelectric liquid crystal compositions aimed in the present invention and no problem is raised.

EXAMPLES 1-10

The respective proportions of the ferroelectric liquid crystal compositions of the present invention described in Examples 1-10 are shown in Table 2 and the respective specific features thereof are shown in Table 3.

Further, the symbols (S) and (R) in Table 2 show that the absolute configurations of optically active groups of compounds are of S form and R form, respectively.

TABLE 2

| | | Example No. | | | | | | | | | |
|---|---|---|---|---|---|---|---|---|---|---|---|
| Compound | | 1 | 2 | 3 | 4 | 5 | 6 | 7 | 8 | 9 | 10 |
| Formula | | | | | | | | | | | |

TABLE 2-continued
| Compound | | 1 | 2 | 3 | 4 | 5 | 6 | 7 | 8 | 9 | 10 |
|---|---|---|---|---|---|---|---|---|---|---|---|
| I | 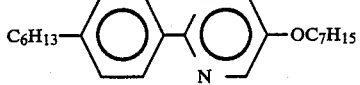 C6H13—⟨⟩—pyrazine—OC7H15 | 9 | | | | | 6 | | | | |
| I | 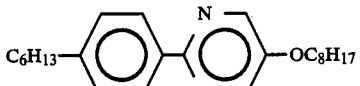 C6H13—⟨⟩—pyrazine—OC8H17 | 10 | 15 | 10 | 10 | | | 10 | 10 | 10 | |
| I | 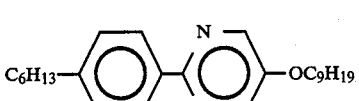 C6H13—⟨⟩—pyrazine—OC9H19 | | 4 | 9 | 6 | 4 | 20 | 15 | 6 | 4 | |
| I | 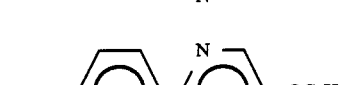 C7H15—⟨⟩—pyrazine—OC7H15 | | 8 | | | 8 | | | | | 8 |
| I | 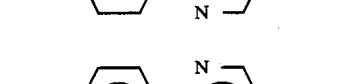 C7H15—⟨⟩—pyrazine—OC8H17 | 24 | | | | 16 | | | | | |
| I | 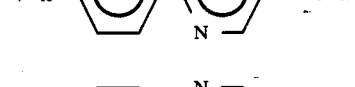 C7H15—⟨⟩—pyrazine—OC9H19 | | 10 | 15 | 10 | 10 | | | 10 | 10 | |
| I | 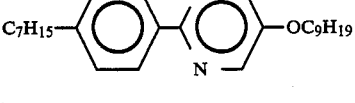 C8H17—⟨⟩—pyrazine—OC8H17 | 6 | | | 4 | | | 4 | | | |
| I | 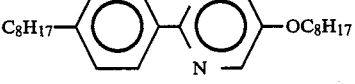 C8H17—⟨⟩—pyrazine—OC9H19 | 6 | | | 4 | | | | | | |
| I | 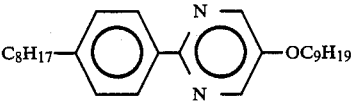 C9H19—⟨⟩—pyrazine—OC8H17 | 15 | | 6 | 4 | 10 | | | | | |
| I | 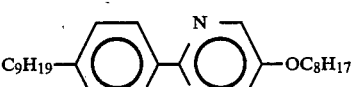 C9H19—⟨⟩—pyrazine—OC9H19 | | 8 | 15 | 10 | 8 | | | 10 | | 8 |
| II | 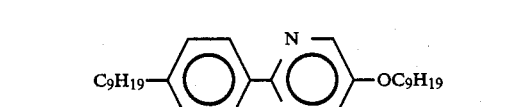 (S)C5H11—⟨⟩—⟨⟩—pyrimidine—CH2CH(*)CH3/C2H5 | | | 20 | | | 5 | 5 | 10 | 10 | |
| III |  (R)C5H11—⟨⟩—⟨⟩—pyrimidine—O—CH2—CH(*)(CH3)—OC6H13 | 20 | 20 | | 15 | 15 | 20 | 10 | 5 | 10 | |

TABLE 2-continued

| Compound | | Example No. | | | | | | | | | |
|---|---|---|---|---|---|---|---|---|---|---|---|
| | | 1 | 2 | 3 | 4 | 5 | 6 | 7 | 8 | 9 | 10 |
| V | (S,S)C$_5$H$_{11}$—⬡—⬡—[pyridine]—O—CH$_2$—CH(CH$_3$)—OC(O)—CH(CH$_3$)—OC$_4$H$_9$ | 20 | 20 | 20 | 20 | 15 | 15 | 10 | 10 | 20 | 20 |
| Others | C$_6$H$_{13}$O—⬡—[pyridine]—C$_8$H$_{17}$ | | | | | | | | 20 | 15 | |
| | C$_5$H$_{11}$—⬡—⬡—[pyridine]—C$_7$H$_{15}$ | 5 | | 5 | 10 | 10 | | 7 | | | 10 |
| | C$_7$H$_{15}$—⬡—⬡—[pyridine]—C$_7$H$_{15}$ | | | | | 5 | | 10 | 8 | | |
| | (S,S)C$_8$H$_{17}$O—⬡—⬡—O—CH$_2$—CH(CH$_3$)—OC(O)—CH(CH$_3$)—OC$_4$H$_9$ | 5 | | 5 | 5 | 5 | 5 | | | 5 | |
| | (R)C$_8$H$_{17}$O—⬡—⬡—O—CH$_2$—CH(CH$_3$)—OC(O)—OC$_6$H$_{13}$ | 10 | | | 10 | 10 | 5 | 5 | | | 10 |
| | (R)C$_7$H$_{15}$—⬡—[pyridine]—⬡—O—CH$_2$—CH(CH$_3$)—OC$_6$H$_{13}$ | | 15 | | | 15 | 5 | | | | |
| | (S)C$_8$H$_{17}$O—⬡—⬡—O—C(O)—⬡(CN)—CH$_2$—CH(CH$_3$)—C$_2$H$_5$ | | | | | | | | 10 | 10 | 15 |
| | (S)C$_6$H$_{13}$—⬡—O—C(O)—⬡—⬡(F)—O—CH(CH$_3$)—C$_6$H$_{13}$ | | | | | | | | | | 5 |

TABLE 3

| Specific features | Example No. | | | | | | | | | |
|---|---|---|---|---|---|---|---|---|---|---|
| | 1 | 2 | 3 | 4 | 5 | 6 | 7 | 8 | 9 | 10 |
| Phase transition point (°C.) | | | | | | | | | | |
| $C_r \to S_C^*$ | −5 | −10 | −3 | −12 | −8 | −5 | −13 | −11 | −10 | −5 |
| $S_C^* \to S_A$ | 62 | 56 | 56 | 71 | 59 | 59 | 69 | 58 | 52 | 59 |
| $S_A \to N^*$ | 78 | 68 | 77 | 81 | 79 | 74 | 78 | 76 | 70 | 82 |
| $N^* \to I_{so}$ | 80 | 73 | 82 | 85 | 82 | 78 | 82 | 80 | 74 | 86 |
| Spontaneous* polarization value (nC/cm$^2$) | 60 | 69 | 55 | 91 | 57 | 61 | 58 | 43 | 54 | 62 |
| Tilt angle* (°) | 24 | 24 | 26 | 29 | 23 | 24 | 28 | 23 | 21 | 23 |
| Helical pitch* (μm) | 3 | 5 | 3 | 4 | 3 | 5 | 7 | 3 | 3 | 5 |
| Response time* (μsec) | 61 | 49 | 67 | 70 | 60 | 67 | 83 | 55 | 52 | 55 |

*Value at 25° C.

EXAMPLE 11

The ferroelectric liquid crystal composition prepared in Example 2 was filled in a cell of 2 μm in cell gap provided with transparent electrodes each obtained by coating the surface with PVA as an aligning agent, followed by rubbing the resulting surface to subject it to a parallel aligning treatment. As a result, a uniform alignment without any fault was obtained. The resulting liquid crystal cell was placed between two polarizers arranged in a state of crossed nicols, followed by impressing a low frequency alternating current of 0.5 Hz and 20 V. As a result, a clear switching operation having a very good contrast (1:20) was observed and a liquid crystal display element having a response time as short as 30 μsec at 25° C. was obtained.

EXAMPLE 12

To the ferroelectric liquid crystal composition prepared in Example 7 was added an anthraquinone dyestuff D-16 (made by BDH Co., Ltd.) expressed by the following formula

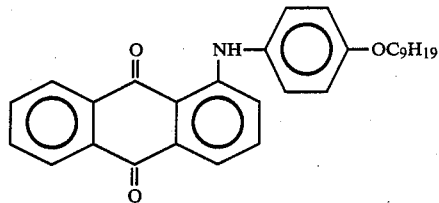

in 3% by weight to prepare a guest-host mode composition.

This composition was filled in a cell of 8 μm in cell gap subjected to the same treatment as in Example 11, followed by arranging one polarizer so that its polarizing surface could be in parallel to the axis of molecules and impressing a low frequency alternate current of 0.5 Hz and 40 V. As a result, a clear switching operation having a very good contrast (1:10) was observed and a color liquid crystal display element having a response time as short as 80 μsec at 25° C. was obtained.

EXAMPLES 13-15

The respective proportions of the ferroelectric liquid crystal compositions of the present invention described in Examples 13-15 are shown in Table 4 and the respective specific features thereof are shown in Table 5. The respective proportions in Table 4 are of by weight.

Further, the symbols (S) and (R) in Table 4 indicate that the absolute configurations of the optically active groups of the compounds are in (S) form and (R) form, respectively.

TABLE 4

| Formula | Compound | Example No. 13 | 14 | 15 |
|---|---|---|---|---|
| I | $C_6H_{13}$—⟨phenyl⟩—⟨pyrazine(N,N)⟩—$OC_7H_{15}$ | | 5 | 5 |
| I | $C_6H_{13}$—⟨phenyl⟩—⟨pyrazine(N,N)⟩—$OC_8H_{17}$ | 15 | 5 | 5 |
| I | $C_6H_{13}$—⟨phenyl⟩—⟨pyrazine(N,N)⟩—$OC_9H_{19}$ | 15 | 5 | 5 |
| I | $C_7H_{15}$—⟨phenyl⟩—⟨pyrazine(N,N)⟩—$OC_7H_{15}$ | | 5 | 5 |
| I | $C_7H_{15}$—⟨phenyl⟩—⟨pyrazine(N,N)⟩—$OC_8H_{17}$ | | | 5 |
| I | $C_8H_{17}$—⟨phenyl⟩—⟨pyrazine(N,N)⟩—$OC_8H_{17}$ | | | 5 |

TABLE 4-continued

| Compound | | Example No. | | |
|---|---|---|---|---|
| | | 13 | 14 | 15 |
| I | C8H17—⟨⟩—pyrazine—OC9H19 | | 5 | |
| II | (S)C5H11—⟨⟩—⟨⟩—pyrazine—CH2CH(CH3)C2H5* | 10 | | |
| V | (SS)C5H11—⟨⟩—⟨⟩—pyrazine—CH2CH(CH3)—O-C(O)-CH(CH3)—OC4H9 | 10 | 10 | 10 |
| Others | C6H13O—⟨⟩—pyrazine—C8H17 | 7 | 7 | 8.7 |
| | C9H19O—⟨⟩—pyrazine—C7H15 | 2 | 2 | 2.5 |
| | C9H19O—⟨⟩—pyrazine—C8H17 | 4 | 4 | 5 |
| | C5H11—⟨⟩—⟨⟩—pyrazine—C6H13 | 4 | 4 | 5 |
| | C6H13—⟨⟩—⟨⟩—pyrazine—C6H13 | | 5 | |
| | C7H15—⟨⟩—⟨⟩—pyrazine—C6H13 | 3 | 8 | 3.8 |
| | C5H11—⟨⟩—⟨⟩—pyrazine—C8H17 | 5 | | |
| | C7H15—⟨⟩—⟨⟩—pyrazine—C8H17 | 5 | | |
| | (S)C8H17O—⟨⟩—⟨⟩—O-C(O)—⟨⟩(CN)—CH2CH(CH3)C2H5* | 5 | 15 | 15 |

TABLE 4-continued

| Compound | Example No. | | |
|---|---|---|---|
| | 13 | 14 | 15 |
| 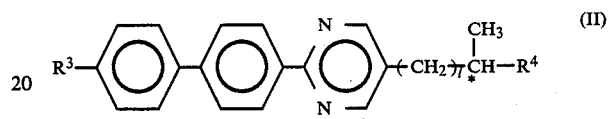 | 10 | 10 | 20 |
| 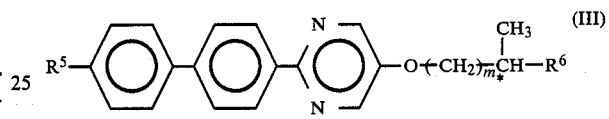 | 5 | 5 | 5 |

TABLE 5

| Specific features | Example | | |
|---|---|---|---|
| | 13 | 14 | 15 |
| Phase transition point (°C.) | | | |
| Cr → Sc* | −5 | −8 | −19 |
| Sc* → $S_A$ | 62 | 60 | 52 |
| $S_A$ → N* | 82 | 86 | 78 |
| N* → Iso | 90 | 88 | 81 |
| Spontaneous polarization value (nC/cm²) | 39 | 40 | 43 |
| Tilt angle* (°) | 25 | 22 | 22 |
| Helical pitch* (μm) | 20 | 12 | 10 |
| Response time* (μsec) | 59 | 62 | 75 |

*Value at 25 °C.

What we claim is:

1. A ferroelectric liquid crystal composition having a cholesteric comprising an achiral compound expressed by the formula

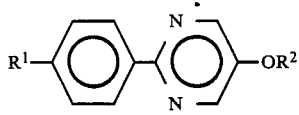  (I)

wherein $R^1$ and $R^2$ each represent the same or different linear or branched chain alkyl group of 1 to 18 carbon atoms, in 20 to 70% by weight, and an optically active compound causing a cholestric phase to appear.

2. A ferroelectric liquid crystal composition according to claim 1, comprising at least one member of optically active compounds selected from the group consisting of compounds expressed by the following formulas (II) to (V) in 10 to 50% by weight and having cholesteric phase:

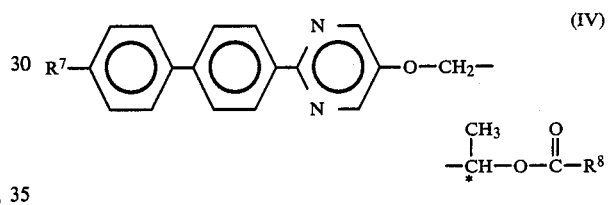

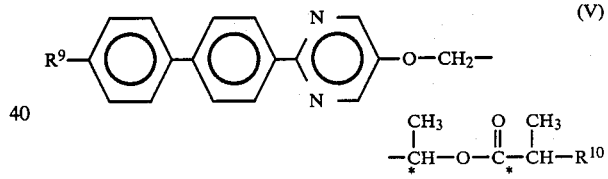

wherein $R^3$, $R^5$, $R^7$ and $R^9$ each represent a linear or branched alkyl group or alkoxy group each of 1 to 18 carbon atoms, $R^4$, $R^6$ and $R^{10}$ each represent a linear or branched alkyl group or alkoxy group each of 2 to 18 carbon atoms or a linear or branched alkoxy group of 1 to 18 carbon atoms, $R^8$ represents a linear or branched chain alkyl group or alkoxy group each of 1 to 18 carbon atoms, l and m each represent an integer of 0 to 10 and * indicates an asymmetric carbon atom.

3. A light switching element containing the ferroelectric liquid crystal composition as set forth in claim 1.

4. A light switching element containing the ferroelectric liquid crystal composition as set forth in claim 2.

* * * * *